(12) United States Patent
Paek et al.

(10) Patent No.: US 12,129,436 B2
(45) Date of Patent: *Oct. 29, 2024

(54) LIQUID PHASE ADSORPTIVE SEPARATION OF CYCLOPARAFFINS FROM HYDROCARBON MIXTURE

(71) Applicant: ExxonMobil Technology and Engineering Company, Annandale, NJ (US)

(72) Inventors: Changyub Paek, Bridgewater, NJ (US); Joseph M. Falkowski, Hampton, NJ (US); Randall D. Partridge, Califon, NJ (US); Yogesh V. Joshi, Bridgewater, NJ (US); Carmen C. Lasso, Newark, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/755,331

(22) PCT Filed: Jul. 22, 2020

(86) PCT No.: PCT/US2020/042951
§ 371 (c)(1),
(2) Date: Apr. 27, 2022

(87) PCT Pub. No.: WO2021/076200
PCT Pub. Date: Apr. 22, 2021

(65) Prior Publication Data
US 2023/0357650 A1    Nov. 9, 2023

Related U.S. Application Data

(60) Provisional application No. 62/915,663, filed on Oct. 16, 2019.

(51) Int. Cl.
*C10G 25/00*    (2006.01)
*B01D 15/42*    (2006.01)
(Continued)

(52) U.S. Cl.
CPC ......... *C10G 25/003* (2013.01); *B01D 15/426* (2013.01); *B01J 20/226* (2013.01);
(Continued)

(58) Field of Classification Search
CPC .... C10G 25/003; C10G 25/12; B01D 15/426; B01J 20/226; B01J 20/3425;
(Continued)

(56) References Cited

U.S. PATENT DOCUMENTS

| 3,468,791 A | 9/1969 | Epperly et al. |
| 8,653,292 B2 | 2/2014 | Hafizovic et al. |

(Continued)

FOREIGN PATENT DOCUMENTS

| CN | 109022029 A | 12/2018 |
| CN | 109550481 A | 4/2019 |

OTHER PUBLICATIONS

Duerinck, T., et.al. "Understanding Hydrocarbon Adsorption in the UiO-66 Metal-Organic Framework: Separation of (Un)saturated Linear, Branched, Cyclic Adsorbates, Including Stereoisomers," J. Phys. Chem. C, 117, 12567-12578 (2013).

(Continued)

*Primary Examiner* — Ali Z Fadhel
(74) *Attorney, Agent, or Firm* — Shook, Hardy & Bacon L.L.P.

(57) ABSTRACT

A process for separating one or more one-ring cycloparaffins and one or more multi-ring cycloparaffins from a hydrocarbon mixture is disclosed. The process comprises the steps of providing the hydrocarbon mixture; and contacting the hydrocarbon mixture with an adsorbent material comprising (Continued)

a metal organic framework to separate the one or more one-ring cycloparaffins and the one or more multi-ring cycloparaffins from the hydrocarbon mixture. The process is conducted in a liquid phase.

21 Claims, 5 Drawing Sheets

(51) Int. Cl.
 *B01J 20/22* (2006.01)
 *B01J 20/34* (2006.01)
 *C10G 25/12* (2006.01)
(52) U.S. Cl.
 CPC ....... *B01J 20/3425* (2013.01); *B01J 20/3475* (2013.01); *C10G 25/12* (2013.01)
(58) Field of Classification Search
 CPC ................ B01J 20/3475; B01J 20/2803; B01J 20/28069; B01J 20/3028
 See application file for complete search history.

(56) References Cited

U.S. PATENT DOCUMENTS

| | | | |
|---|---|---|---|
| 11,634,371 B2* | 4/2023 | Paek | ............... B01J 20/226 585/822 |
| 2018/0079970 A1* | 3/2018 | Chawla | ............... C10G 25/03 |

OTHER PUBLICATIONS

Cavka, J.H. et al., "A new zirconium inorganic building brick forming metal organic frameworks with exceptional stability," J. Am. Chem. Soc., 130, 13850-51 (2008).
Thommes, M. et al., "Physisorption of gases, with special reference to the evaluation of surface area and pore size distribution (IUPAC Technical Report)," Pure Appl. Chem., 87(9-10):1051-1069 (2015).
PCT/US2020/042951 International Search Report and Written Opinion dated Sep. 21, 2020.

* cited by examiner

LIQUID PHASE ADSORPTIVE SEPARATION OF CYCLOPARAFFINS FROM HYDROCARBON MIXTURE

CROSS-REFERENCE TO RELATED APPLICATIONS

This application is the 35 USC § 371 National Stage Application for PCT Application Number PCT/US2020/042951 filed on Jul. 22, 2020 which claims the benefit of U.S. Provisional Application No. 62/915,663, filed on Oct. 16, 2019, the entire contents of both of which are incorporated herein by reference.

FIELD

The present invention relates to a liquid phase process for the separation of one-ring cycloparaffins and multi-ring cycloparaffins from a hydrocarbon mixture. The process uses a metal-organic framework material.

BACKGROUND

Separation of cycloparaffins from hydrocarbon streams could allow more efficient operation and/or optimization of downstream refining processes, such as catalytic reformers. Separated cycloparaffinic feed for a reformer could help reduce cracking, which is one of undesired reactions occurring during reforming, at given conditions as cracking molecules are primarily normal-paraffins and branched paraffins. Running cycloparaffinic feed could also increase hydrogen production and reduce reforming severity by operating at lower temperatures without sacrificing product specification (i.e., octane number).

Distillation is typically used to separate various components of a liquid hydrocarbon mixture. However, since distillation uses boiling points to separate the various components of a mixture, it is not used to separate different classes of compounds, which may have similar boiling points.

Methods for selective adsorption and separation of linear and branched alkanes, cyclic molecules, and stereoisomers from a hydrocarbon mixture have been disclosed using metal organic framework (MOF). See, e.g., Duerinck, T., et.al. "Understanding Hydrocarbon Adsorption in the UiO-66 Metal-Organic Framework: Separation of (Un)saturated Linear, Branched, Cyclic Adsorbates, Including Stereoisomers," *J. Phys. Chem. C*, 117, 12567-12578 (2013). The separation was performed using gas chromatography. However, the separation could be different in liquid phase due to competitive adsorption with solvent (i.e., desorbent).

High performance liquid chromatography (HPLC) columns comprising zeolites have been disclosed for the separation of normal paraffins, iso-paraffins and naphthenes from a hydrocarbon sample. See, e.g., U.S. Patent Application Publication No. 2018/0079970 A1.

There remains a need for more efficient and more selective processes for liquid phase separation of cycloparaffins from complex hydrocarbon mixture in commercial applications.

SUMMARY

The disclosure herein refers to a liquid phase process for separating one or more one-ring cycloparaffins and one or more multi-ring cycloparaffins from a hydrocarbon mixture. The process uses a metal-organic framework material.

In one aspect, the present invention is a process comprising the steps of: providing a hydrocarbon mixture; and contacting the hydrocarbon mixture with an adsorbent material comprising a metal organic framework to separate one or more one-ring cycloparaffins and one or more multi-ring cycloparaffins from the hydrocarbon mixture. The process is conducted in a liquid phase.

In some embodiments, the hydrocarbon mixture comprises one or more n-paraffins, one or more iso-paraffins, one or more one-ring cycloparaffins, and one or more multi-ring cycloparaffins. In some embodiments, the process generates a first eluate comprising one or more n-paraffins and one or more iso-paraffins and a second eluate comprising one or more one-ring cycloparaffins and one or more multi-ring cycloparaffins.

In some embodiments, generating the first eluate and the second eluate further comprises desorbing using a solvent.

In some embodiments, the process comprises separating one or more one-ring cycloparaffins, and one or more two-ring cycloparaffins from the hydrocarbon mixture.

In some embodiments, the hydrocarbon mixture comprises one or more aromatic hydrocarbons, one or more n-paraffins, one or more iso-paraffins, one or more one-ring cycloparaffins, and one or more multi-ring cycloparaffins. In some embodiments, the process generates a first eluate comprising the one or more n-paraffins and the one or more iso-paraffins and a second eluate comprising one or more aromatic hydrocarbons, the one or more one-ring cycloparaffins, and the one or more multi-ring cycloparaffins.

In some embodiments, the process is performed between about 1 bar to about 100 bar.

In some embodiments, the process is performed between about 25° C. and about 250° C.

In some embodiments, the metal organic frameworks of the process of the present invention contain defects, which provide unexpected separation properties.

In some embodiments, the metal organic framework comprises secondary building units which are comprised of zirconium, hafnium, cerium, or titanium.

In some embodiments, the metal organic framework is a zirconium-based metal organic framework. In some embodiments, the zirconium-based metal organic framework comprises a micropore volume, as measured by $N_2$ adsorption at 77 K, greater than 0.38 cc/g. In some embodiments, the zirconium-based metal organic framework comprises a residual inorganic mass after combustion of the zirconium-based metal organic framework that is greater than about 45% of dry weight of zirconium-based metal organic framework measured at 300° C. In some embodiments, the zirconium-based metal organic framework comprises a general formula $Zr_6O_4(OH)_4BDC_{(6-x)}$, wherein BDC refers to benzene-1,4-dicarboxylate, and wherein x is greater than 0.5 as determined by residual inorganic mass after combustion.

BRIEF DESCRIPTION OF DRAWINGS

Chromatographic traces for a pulse injection of hydrocarbon mixtures on a defective UiO-66 Zr-MOF of the present invention using iso-octane as solvent at 150° C. are depicted in two different formats.

Chromatographic traces for a pulse injection of hydrocarbon mixtures on a commercial UiO-66 Zr-MOF using iso-octane as solvent at 150° C. are depicted in FIG. 2, which shows overlays of individual chromatographic traces of components.

Chromatographic traces for a pulse injection of hydrocarbon mixtures on a defective UiO-66 Zr-MOF of the present invention using n-hexane as solvent at 150° C. are depicted in two different formats.

Breakthrough curves for hydrocarbon mixtures on a defective UiO-66 Zr-MOF of the present invention using n-hexane as solvent at 150° C. are depicted in two different formats.

Breakthrough curves for hydrocarbon mixtures on a defective UiO-66 Zr-MOF of the present invention using different solvents at 150° C. are depicted in two different formats.

DETAILED DESCRIPTION

The disclosure herein refers to a liquid phase process for separating cycloparaffins (i.e., naphthenes) from a hydrocarbon mixture. The process uses a metal-organic framework material. The process is particularly suitable for separating one or more one-ring cycloparaffins and one or more multi-ring cycloparaffins from hydrocarbon mixtures.

The hydrocarbon mixture can comprise any combination of hydrocarbons with cycloparaffins. In some embodiments, the hydrocarbon mixture comprises one or more normal paraffins (i.e., n-paraffins), one or more branched paraffins (i.e., iso-paraffins), one or more aromatic hydrocarbons, or combinations thereof, in addition to cycloparaffins. In some embodiments, the hydrocarbon mixture comprises one or more n-paraffins, one or more iso-paraffins, or combinations thereof, in addition to cycloparaffins. In a preferred embodiment, cycloparaffins include one or more one-ring cycloparaffins and one or more multi-ring cycloparaffins.

In some embodiments, the hydrocarbon mixture can include at least five carbon atoms per molecule. In some embodiments, the hydrocarbon mixture can include five to twenty-five carbon atoms per molecule. In some embodiments, the hydrocarbon mixture can include up to about 95% n-paraffins. In some embodiments, n-paraffins that can be present in the hydrocarbon mixture have at least five carbon atoms per molecule. In some embodiments, n-paraffins that can be present in the hydrocarbon mixture have five to twenty-five carbon atoms per molecule. In some embodiments, the hydrocarbon sample can include up to about 95% iso-paraffins. In some embodiments, the hydrocarbon mixture can include up to about 95% aromatic hydrocarbons. In some embodiments, the hydrocarbon mixture can include up to about 95% cycloparaffins. In some embodiments, the cycloparaffins that can be present in the hydrocarbon mixture have at least six carbon atoms per molecule. In some embodiments, the cycloparaffins that can be present in the hydrocarbon mixture have six to twenty-five carbon atoms per molecule. Non-limiting examples of cycloparaffins that can be present in the hydrocarbon mixture include, e.g., cyclohexane, decalin, n-octadecyl-c-hexane ($C_{24}H_{48}$), or combinations thereof.

The components included in the hydrocarbon mixture can be substituted or unsubstituted. In some embodiments, the hydrocarbon mixture comprises one or more substituted or unsubstituted n-paraffins, one or more substituted or unsubstituted iso-paraffins, one or more substituted or unsubstituted aromatic hydrocarbons, or combinations thereof, in addition to substituted or unsubstituted cycloparaffins. In some embodiments, the cycloparaffins comprise decalins. Non-limiting examples of decalins include, e.g., substituted or unsubstituted decalins, branched or unbranched decalins. In one example, the decalin is methyl decalin. In another example, the decalin is cis-/trans-decalin.

Contacting the hydrocarbon mixture with an adsorbent material can be performed using a variety of known techniques. For example, the hydrocarbon mixture can contact a bed of an adsorbent material in a down flow direction (e.g., flow directed by gravity). In non-limiting embodiments, the first adsorbent can be present in a column and the hydrocarbon mixture can be applied to a column containing the adsorbent material. In some embodiments, the bed of a first adsorbent can be contained within a liquid chromatography column. The liquid chromatography column can be, for example, a no-pressure, a low-pressure or a high performance liquid chromatography (HPLC) column. In one example, the adsorbent material can be contained within a HPLC column.

The process of the present invention generates a first eluate comprising some or all of the other components in the hydrocarbon mixture other than the one or more cycloparaffins, and a second eluate comprising the one or more cycloparaffins. In some embodiments, the first eluate comprises the one or more n-paraffins and the one or more iso-paraffins, and the second eluate comprises the one or more one-ring cycloparaffins and one or more multi-ring cycloparaffins. In some embodiments, the first eluate comprises the one or more n-paraffins and the one or more iso-paraffins, and the second eluate comprises the one or more aromatic hydrocarbons, the one or more one-ring cycloparaffins and one or more multi-ring cycloparaffins. Non-limiting examples of the one or more multi-ring cycloparaffins include, e.g., one or more two-ring cycloparaffins.

The process of generating the first eluate and the second eluate further comprises desorbing using a solvent (i.e., desorbent). The hydrocarbon mixture can contact the adsorbent material in the presence of the solvent. In some embodiments, the solvent can contact the adsorbent material prior to and/or after the contact of the hydrocarbon mixture with the adsorbent material. In alternate embodiments, the hydrocarbon mixture can contact the adsorbent material concomitantly with the solvent.

In some embodiments, the solvent is a non-polar solvent. In some embodiments, the solvent is a saturated hydrocarbon, an aromatic hydrocarbon, or mixtures thereof. Non-limiting examples of the solvent include, e.g., iso-octane, n-hexane, toluene, benzene, $CO_2$, ammonia, or mixtures thereof.

In some embodiments, the solvent can include one or more lower paraffins. A "lower paraffin," as used herein, includes a paraffin that has one to eight carbon atoms. Non-limiting examples of solvents for use with the adsorbent material include hexane, iso-hexane, heptane, iso-heptane, octane, iso-octane or combinations thereof. In one example, the solvent can include iso-octane. In an alternate example, the solvent can include hexane and iso-octane. In an alternate example, the solvent can include hexane and iso-octane, with the amount of hexane in the combination being about 0-99% of the total.

As embodied herein, the linear flow velocity of the hydrocarbon mixture solution through the adsorbent material can be from about 0.3 cm/min to about 30.0 cm/min, e.g., from about 6.0 cm/min to about 30.0 cm/min, from about 6.0 cm/min to about 24.0 cm/min, from about 6.0 cm/min to about 18.0 cm/min or from about 6.0 cm/min to about 12.0 cm/min. In one example, the flow rate of the hydrocarbon sample through the adsorbent material can be about 2.4 cm/min.

In some embodiments, the process is performed at a temperature from about 25° C. to about 250° C. The stability of the metal-organic framework material will determine higher end temperature. In one example, the temperature can be about 150° C. In some embodiments, the process is performed at a pressure of about 1 bar to about 100 bar. In one example, the pressure can be 50 bar.

The adsorbent material used in the process of the present invention comprises a metal-organic framework (MOF) material. In some embodiments, the MOFs are constructed from transition or rare earth metal ions as nodes and multidentate organic ligands containing O- or N-donors as linkers. In some embodiments, the MOF is zirconium, hafnium, cerium, or titanium-based MOF. In one example, the MOF is a zirconium-based MOF.

In some embodiments, the MOFs have hexanuclear $Zr_6$ inorganic cornerstones. Non-limiting example of such a Zr-MOF includes, e.g., $Zr_6O_{32}$ cornerstones. They are disclosed in, for example, U.S. Pat. No. 8,653,292, which is incorporated by reference herein. In some embodiments, the Zr-MOF comprises $Zr_6O_{32}$ clusters bridged by polytopic, carboxylate-based linkers. One example of a commercially available Zr-MOF is UiO-66 ($Zr_6(OH)_4O_4(BDC)_6$, wherein "BDC" is benzene-1,4-dicarboxylate), which, for example, is sold by ProfMOF, as UiO-66-BDC. UiO-66 Zr-MOF is described in, for example, Cavka, J. H. et al., "A new zirconium inorganic building brick forming metal organic frameworks with exceptional stability," *J. Am. Chem. Socs.*, 130, 13850-51 (2008), which is incorporated by reference herein.

The commercially available MOFs can be nearly free of defects. In contrast, the MOFs of the process of the present invention contain defects, which provide unexpected separation properties. Defect modulators are used to prepare the MOFs used in the present invention. In some embodiments, the defect modulators are monocarboxylic acids that are shorter in length than the multidentate organic ligands of the MOF. Non-limiting examples of suitable defect modulators include, e.g., acetic acid, formic acid, benzoic acid, trifluoroacetic acid, difluoroacetic acid, fluoroacetic acid, trichloroacetic acid, dichloroacetic acetic acid, chloroacetic acid, or alkyl derivatives of acetic acid. In one example, a defective modulator is acetic acid. In one example, the method of preparing the Zr-based MOFs with defects comprises reacting a zirconium starting material, such as zirconiumoxydichloride hydrate, with a ditopic ligand, such as terephthalic acid, in the presence of a defect modulator, such as acetic acid.

The inventors of the present application have unexpectedly found that using a MOF prepared by the process described herein unexpectedly separates the one or more one-ring cycloparaffins and the one or more multi-ring cycloparaffins from a hydrocarbon mixture. This is further illustrated in the Examples below. The process for separating involves the steps of providing the hydrocarbon mixture and contacting the hydrocarbon mixture with an adsorbent material comprising the MOF. This process can advantageously be performed in a liquid phase. Another advantage of this process is that it can also be used to separate cycloparaffins at higher concentrations than Henry's regime (linear concentration range in isotherm) where one may get better separation. The separation of cycloparaffins at these higher concentrations (non-linear concentration range in isotherm) is more economical, and thus is advantageous for commercial applications.

Without being bound by theory, it is hypothesized that preparing the MOF as described herein opens a larger pore aperture, and thus, increases accessibility of larger molecules to the pores for competitive adsorption. As a result, enhanced selectivity towards multi-ring cycloparaffins is obtained, which is unexpected. This is shown, for example in Table 2 below. Enhanced selectivity allows operation of separation process at higher productivity and with higher purity.

In some embodiments, the level of defect in an MOF can be inferred from micropore volume as measured by nitrogen adsorption at 77 K, as described in Thommes, M. et al., "Physisorption of gases, with special reference to the evaluation of surface area and pore size distribution (IUPAC Technical Report)," *Pure Appl. Chem.*, 87(9-10):1051-1069 (2015), which is incorporated by reference herein. For the commercial material obtained from ProfMOF (UiO-66-BDC), the measured micropore volume of 0.38 cc/g represents a lower bound. Accordingly, when this commercial material is modified for the present process, it needs to have a measured micropore volume of greater than 0.38 cc/g.

In some embodiments, the level of defect in an MOF can be inferred from the weight of residual inorganic solids as measured by thermogravimetric analysis. In this method, the weight of the sample of MOF remaining after combusting the sample is compared to the dry weight of the sample of MOF as measured at 300° C. Specifically, the residual inorganic mass is obtained by heating a sample of the MOF in air flowing at a rate between about 3° C./min and 10° C./min. The weight of the sample of MOF as measured at temperatures above 600° C. is compared to the dry mass of the sample of MOF as measured at 300° C. Residual inorganic mass can then be described as $Mass_{600° c.}/Mass_{300° C.}$. For the commercial material obtained from ProfMOF (UiO-66-BDC), % inorganic solids measured by this method was about 45 wt %. Accordingly, when this commercial material is modified for the present process, it needs to have a residual inorganic mass after combustion of greater than about 45 wt % of that of the dry sample at 300° C. In some embodiments, the Zr-MOF of the present invention can be represented by a general formula $Zr_6O_4(OH)_4BDC_{(6-x)}$, wherein BDC refers to benzene-1,4-dicarboxylate, and wherein x is greater than 0.5 as determined by residual inorganic mass after combustion.

In some embodiments, the adsorbent material of the present invention comprises the MOF and a binder for commercial packing material preparation. The binder can be an inorganic binder (such as alumina or silica), or the binder can be an organic binder (such as an organic polymer). In some embodiments, the adsorbent material comprises about 95% MOF and about 5% binder. Alternatively, the adsorbent material comprises about 90% MOF and about 10% binder. Alternatively, the adsorbent material comprises about 85% MOF and about 15% binder.

In some embodiments, the process is performed in batch or continuous mode.

The following examples are given as specific illustrations of the claimed invention. It should be understood, however, that the invention is not limited to the specific details set forth in the examples.

Example 1

A Zr-MOF of the present invention was synthesized as follows:

A hydrate of a zirconium compound was reacted with at least one at least bidentate organic compound which can bind to the zirconium by coordination. The reaction occurred in a mixture of dimethylformamide and acetic acid at temperatures above 80° C., optionally with mechanical stirring. The resulting material was isolated and washed with a high-boiling polar aprotic solvent followed by a low boiling polar-aprotic solvent. The material was then dried between 100° C. and 150° C. under air for 4 or more hours. The resulting Zr-MOF is a defective UiO-66 Zr-MOF, as discussed above.

Non-limiting examples of the starting zirconium compound include, e.g., hydrate of an alkoxide, acetonate, halide, sulfide, salt of an organic or inorganic oxygen-comprising acid of zirconium, of mixtures thereof.

Example 2

Preparation of the Defective UiO-66 Zr-MOF: Zr-MOF was prepared in accordance with the procedure of EXAMPLE 1. Specifically, 92.25 g of zirconyldichloride hydrate was reacted with 66.4 g of terephthalic acid. The reaction occurred in a mixture of 937.5 ml of dimethylformamide (DMF) and 562.5 ml of acetic acid at a temperature of 120° C., with mechanical stirring. The resulting material was isolated and washed with 500 mL of DMF followed by 500 mL of acetone. The material was then dried between 100° C. and 150° C. under air for greater than 5 hours. In this procedure, acetate was used as defect modulator.

The above defective UiO-66 Zr-MOF exhibited an X-ray diffraction pattern containing peaks at d-spacings of about 11.98 Å, 10.37 Å, 7.32 Å, 6.24 Å, 5.98 Å, and 5.18 Å. The adsorbent material comprising the above defective UiO-66 Zr-MOF also exhibited such an X-ray diffraction pattern.

Liquid Chromatography Using the Defective UiO-66 Zr-MOF of The Present Invention: The above defective UiO-66 Zr-MOF was evaluated for adsorptive separation of cycloparaffins from hydrocarbon mixtures. A liquid chromatographic system was used for the breakthrough/pulse study of adsorbent comprising the above Zr-MOF at elevated temperature. The adsorbent was pelleted, sized to 100-200 mesh and dry-packed into 4.6 mm ID×100 mm long stainless steel columns with 0.5 micron frits at each end. The adsorbent was dried at 150° C. for 2 hours in a flow of dry nitrogen. Prior to injection, the column was equilibrated at 150° C. with 2,2,4-trimethyl pentane (iso-octane) as solvent (i.e., desorbent). A synthetic hydrocarbon mixture solution was prepared using standard compounds, including n-heptane ("nC7"), n-octane ("nC8"), dodecane ("nC12"), 2-methylheptane ("2MC7"), 4-methylheptane ("4MC7"), 2,4-dimethylhexane ("2,4DMC6"), 2,5-dimethylhexane ("2,5DMC6"), cyclohexane ("CyC6"), cis-/trans-decalins ("DHNC/DHNT"). The mixture was introduced to the column through loop injection. The flow rate of solvent was set at 0.4 ml/min at an inlet pressure of about 50 bar. Effluent from the column was collected in the fraction collector and concentrations of each component in the fractions were analyzed by GC.

Figure 1A:
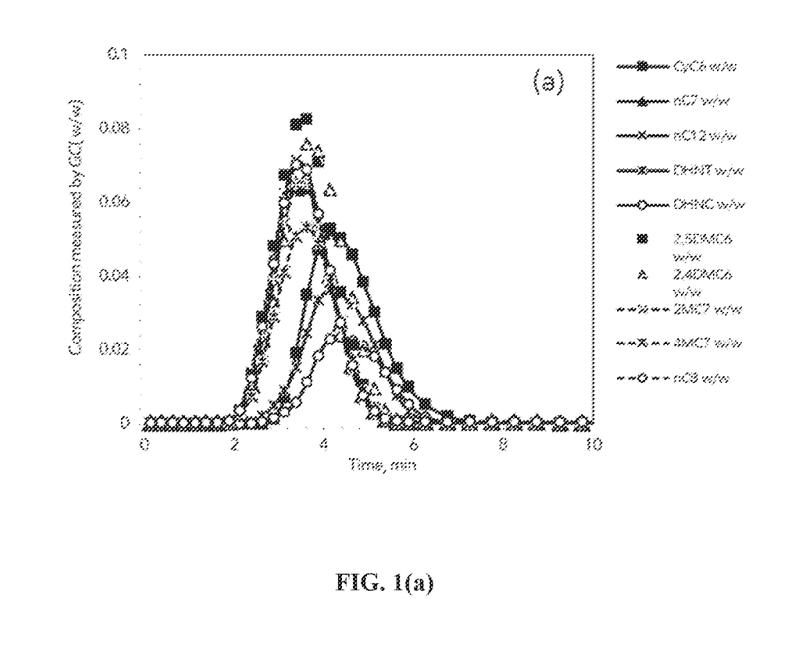
FIG. 1(a) depicts overlays of individual chromatographic traces of components.
Figure 1B:
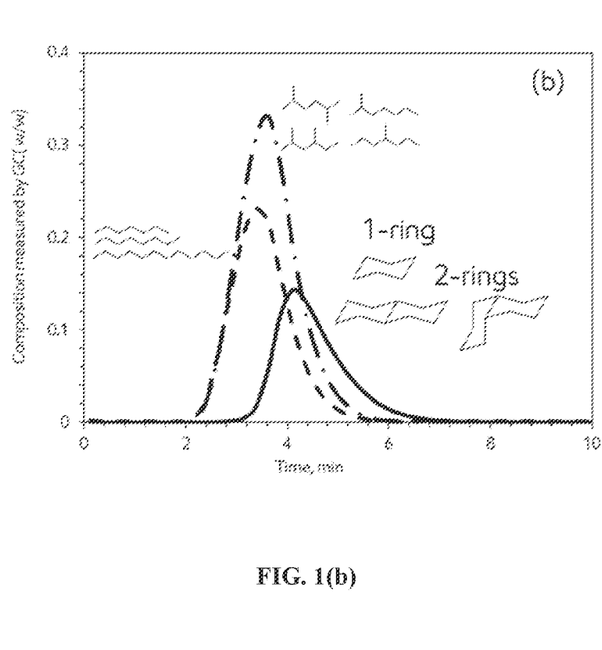
FIG. 1(b) depicts overlays of chromatographic traces by a compound class.

Chromatographic traces for the pulse injection of the hydrocarbon mixture on the defective UiO-66 Zr-MOF of EXAMPLE 2 are depicted in two different formats: FIG. 1(a) depicts overlays of individual chromatographic traces of components; FIG. 1(b) depicts overlays of chromatographic traces by a compound class. The results show that both the 1-ring cycloparaffin and the 2-ring cycloparaffin were selectively retained and separated from the normal and branched paraffins. This was unexpected as seen from the results below obtained using a commercial UiO-66 Zr-MOF.

Figure 2:
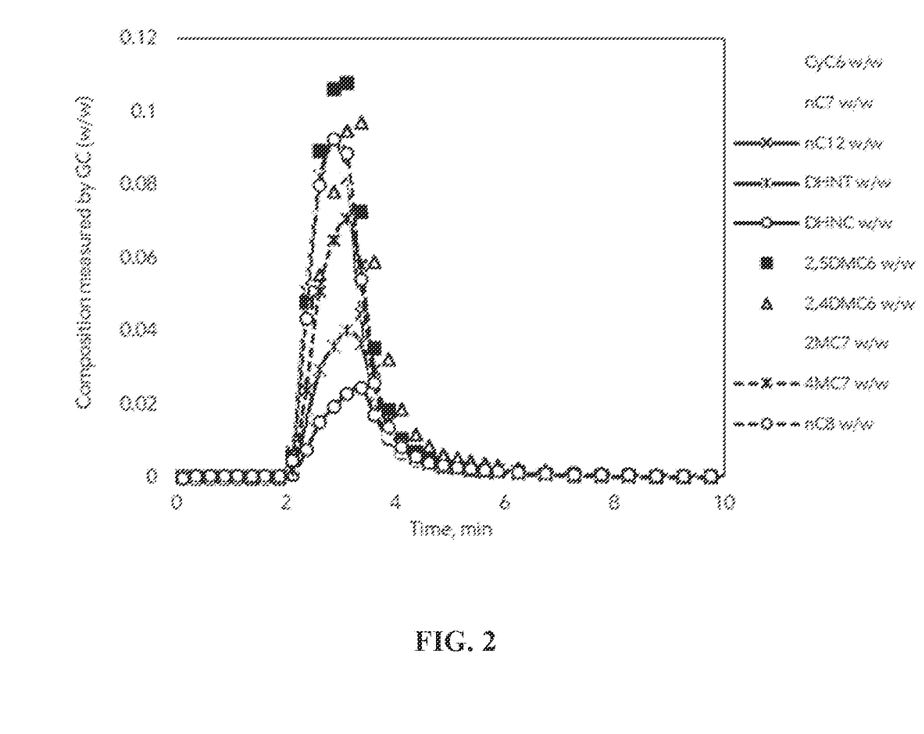

Comparative Analysis: Adsorbent comprising commercial UiO-66 Zr-MOF[1] was packed into the liquid chromatographic system described above. The same pulse experiment under the same conditions as for EXAMPLE 2 was performed. Chromatographic traces for the pulse injection of the hydrocarbon mixture on the commercial UiO-66 Zr-MOF are depicted in FIG. 2(a), which shows overlays of individual chromatographic traces of components. The results show that cyclohexane was selectively retained, but all the rest of components in the hydrocarbon mixture were eluted together without much retention on the bed. The 2-ring cycloparaffins were eluted with normal and branched paraffins together.

[1] UiO-66-BDC from ProfMOF was used.

Comparing the chromatographic traces using adsorbents comprising the commercial UiO-66 Zr-MOF (FIG. 2(a)) versus those using the defective UiO-66 Zr-MOF of EXAMPLE 2 (FIG. 1(a)), it is seen that when the defective UiO-66 Zr-MOF was used, unexpected separation of both the 1-ring cycloparaffin and the 2-ring cycloparaffin from the hydrocarbon mixture was observed. Table 1 below summarizes $N_2$ sorption results and shows that the defective UiO-66 Zr-MOF has higher surface area and pore volume than the commercial defect-free UiO-66 Zr-MOF. This could lead to overall higher adsorption capacity, which is shown by increased retention of cyclohexane on the defective UiO-66 Zr-MOF. Without being bound by theory, it is hypothesized that smaller acetate linker, substituting for terephthalate, could have created larger pore windows, giving more pore accessibility of 2-ring cycloparaffins for adsorption.

TABLE 1

| | Commercial UiO-66 Zr-MOF | Defective UiO-66 Zr-MOF of EXAMPLE 2 |
| --- | --- | --- |
| BET surface area (m$^2$/g) | 1057 | 1219 |
| Micropore volume (cm$^3$/g) | 0.38 | 0.45 |
| Total pore volume (cm$^3$/g) | 0.45 | 0.64 |

Table 2 below compares the selectivity of the adsorbent material comprising the commercial UiO-66 Zr-MOF with that of the adsorbent material comprising the defective UiO-66 Zr-MOF of the present invention.

TABLE 2

| | nC7 | CyC6 | DHNT | DHNC |
| --- | --- | --- | --- | --- |
| Commercial UiO-66 Zr-MOF | 1.0 | 1.8 | 1.2 | 1.3 |
| Defective UiO-66 Zr-MOF of present invention | 1.0 | 1.7 | 2.0 | 2.3 | nC7, CyC6, DHNT, and DHNC are described above.

Example 3

Figure 3A:
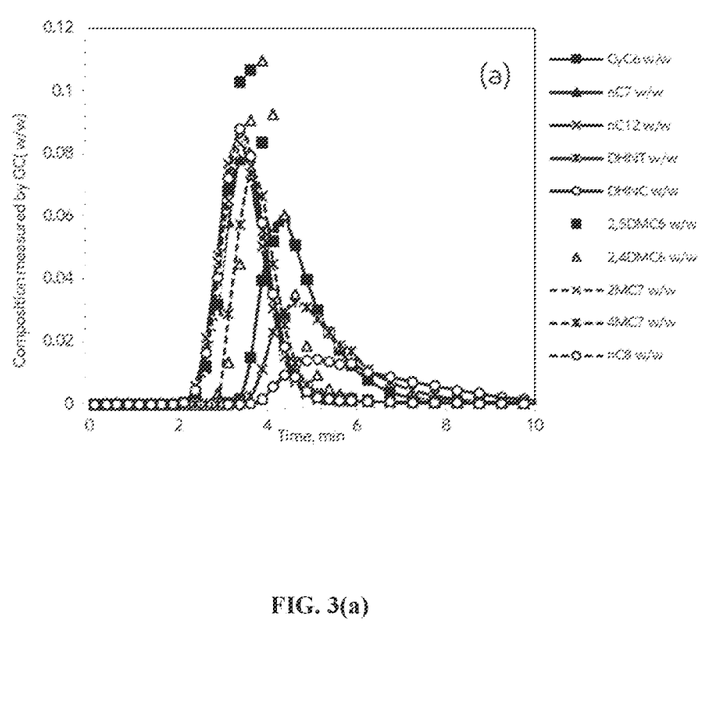
FIG. 3(a) depicts overlays of individual chromatographic traces of components.
Figure 3B:
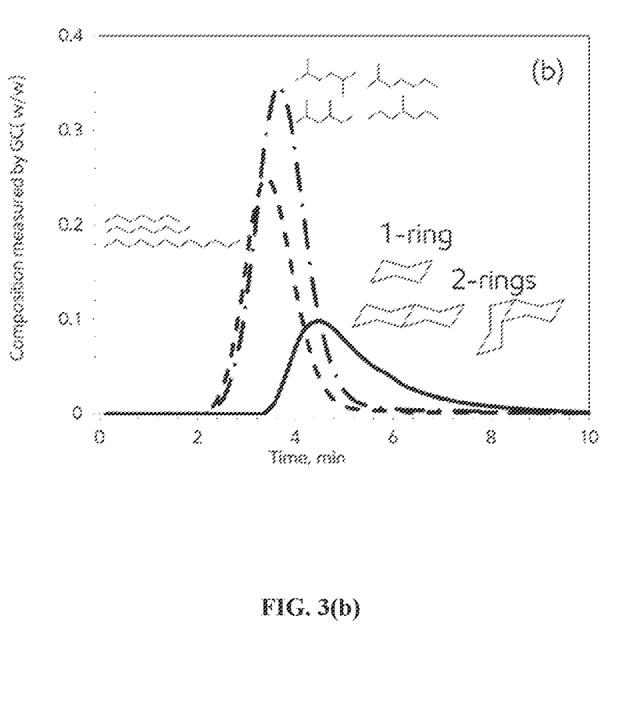
FIG. 3(b) depicts overlays of chromatographic traces by a compound class.

Proper selection of the solvent (desorbent) can enhance separation of cycloparaffins from normal-paraffins and branched-paraffins. Solvent strongly affects separation of cycloparaffins as it competes with adsorbates. The same pulse experiment under the same conditions as for EXAMPLE 2 was performed, except that normal hexane was used as the solvent instead of iso-octane of EXAMPLE 2. Chromatographic traces for the pulse injection of hydrocarbon mixtures on the defective UiO-66 Zr-MOF of EXAMPLE 2 using n-hexane as solvent at 150° C. are depicted in two different formats: FIG. 3(a) depicts overlays of individual chromatographic traces of components; FIG. 3(b) depicts overlays of chromatographic traces by a compound class. When linear paraffins like normal hexane are used as solvents, cycloparaffins (both 1-ring and 2-rings) resolution was increased compared to when iso-octane was used as solvent. This also suggests that a bulkier solvent molecule (iso-octane in this example) strongly competes with adsorbates in the pores.

Example 4

Figure 4A:
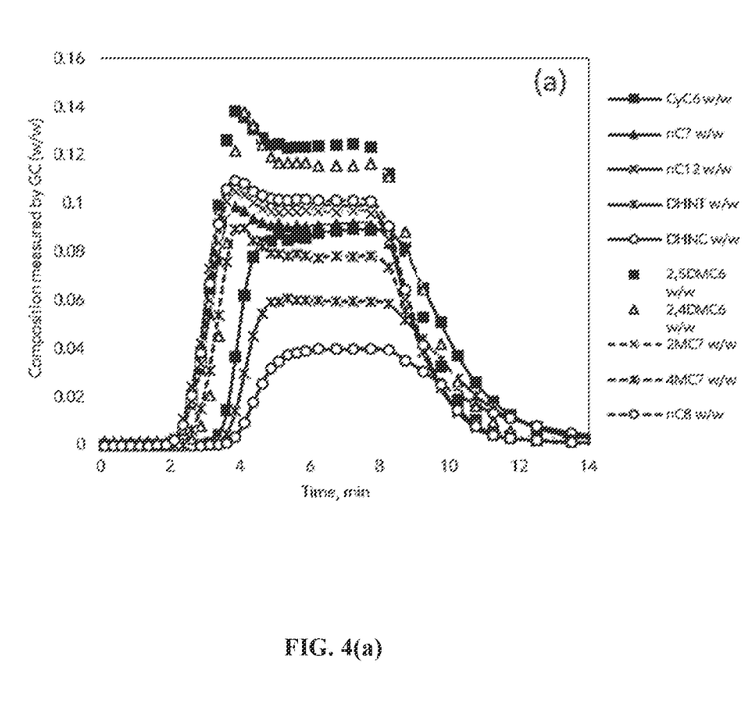
FIG. 4(a) depicts overlays of individual breakthrough curves of components.
Figure 4B:
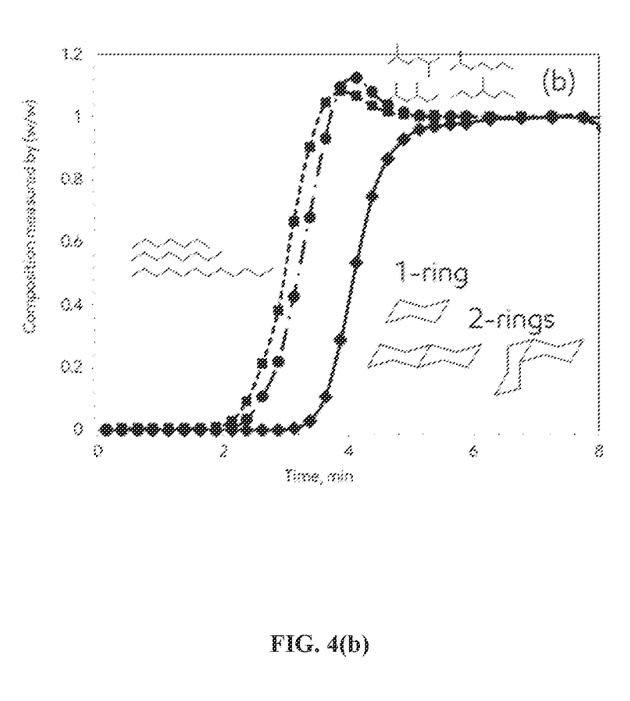
FIG. 4(b) depicts overlays of breakthrough curves by a compound class (normalized by each component's initial concentration).

This separation on a defective UiO-66 Zr-MOF was further studied by the breakthrough experiment using normal hexane as solvent. The injection volume was 6.3 times larger than that of EXAMPLE 2. Breakthrough curves for hydrocarbon mixtures on the defective UiO-66 Zr-MOF of EXAMPLE 2 using n-hexane as solvent at 150° C. are depicted in two different formats: FIG. 4(a) depicts overlays of individual breakthrough curves of components; FIG. 4(b) depicts overlays of breakthrough curves by a compound class (normalized by each component's initial concentration). The results show the same trend that all cycloparaffins adsorbs more strongly compared to the other hydrocarbons as shown by the delayed breakthrough point. FIG. 4(b) presents roll-up of normal paraffins caused by stronger adsorption of branched paraffins, followed by roll-up of branched paraffins due to stronger adsorption of cycloparaffins. The results also demonstrate competitive adsorption of cycloparaffins over other components at fully loaded concentration of the mixture onto the adsorbent bed, and thus is advantageous for commercial applications. This also suggests that defective UiO-66 Zr-MOF of the present invention could potentially be used to separate between normal and branched paraffins.

Example 5

Figure 5A:
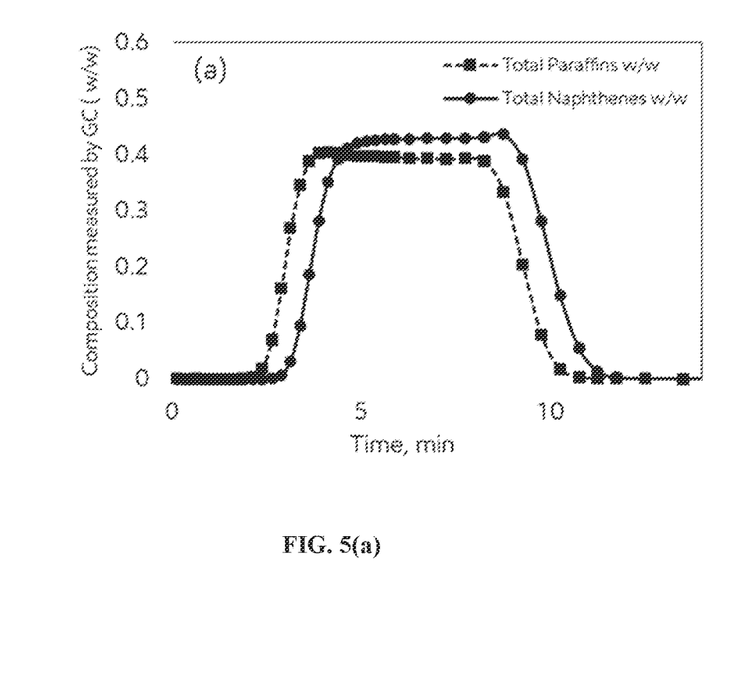
FIG. 5(a) depicts breakthrough curves using iso-octane as solvent.
Figure 5B:
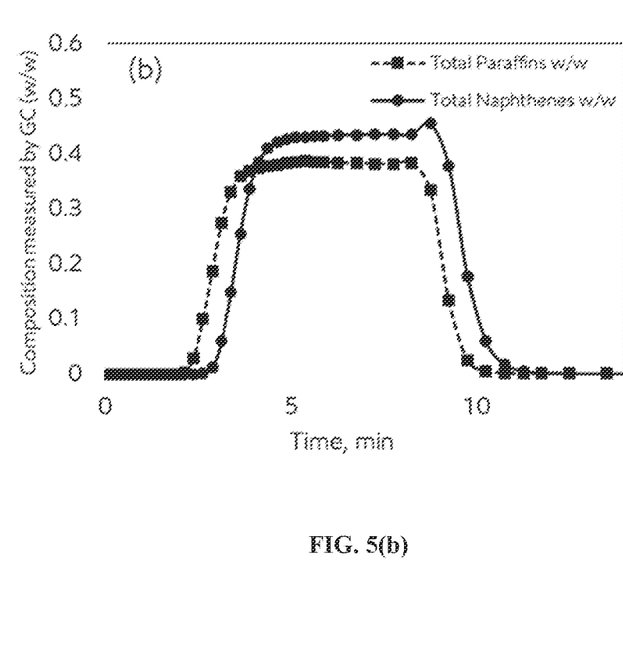
FIG. 5(b) depicts breakthrough curves using toluene as solvent.

The same mixtures of paraffins and cycloparaffins as in EXAMPLE 2 were run on the same defective UiO-66 Zr-MOF of EXAMPLE 2, but with a different solvent, namely toluene. Breakthrough curves for hydrocarbon mixtures on the defective UiO-66 Zr-MOF of EXAMPLE 2 using different solvents at 150° C. are depicted in two different formats: FIG. 5(a) depicts breakthrough curves using iso-octane as solvent; FIG. 5(b) depicts breakthrough curves using toluene as solvent. In FIG. 5(a) and FIG. 5(b), "Total Paraffins" include n-heptane and n-dodecane; "Total Naphthenes" include cyclohexane, cis-decalin, and trans-decalin. FIG. 5(b) shows that the use of toluene (i.e., an aromatic hydrocarbon) as solvent (desorbent) can also offer separation of cycloparaffins from the mixture.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A process for separating one or more one-ring cycloparaffins and one or more multi-ring cycloparaffins from a hydrocarbon mixture, the process comprising the steps of:
    providing the hydrocarbon mixture; and
    contacting the hydrocarbon mixture with an adsorbent material comprising a metal organic framework to separate at least a portion of the one or more one-ring cycloparaffins and the one or more multi-ring cycloparaffins from the hydrocarbon mixture, the metal organic framework being selected from the group consisting of zirconium-based metal organic framework, hafnium-based metal organic framework, cerium-based metal organic framework, titanium-based metal organic framework, or a combination thereof,
    wherein the process is conducted in a liquid phase.

2. The process of claim 1, wherein the hydrocarbon mixture comprises one or more n-paraffins, one or more iso-paraffins, one or more one-ring cycloparaffins, and one or more multi-ring cycloparaffins.

3. The process of claim 2, wherein the process generates a first eluate comprising at least a portion of the one or more n-paraffins and at least a portion of the one or more iso-paraffins and a second eluate comprising the at least a portion of the one or more one-ring cycloparaffins and one or more multi-ring cycloparaffins.

4. The process of claim 3, wherein generating the first eluate and the second eluate further comprises desorbing using a solvent.

5. The process of claim 4, wherein the solvent is a saturated hydrocarbon, an aromatic hydrocarbon, or mixtures thereof.

6. The process of claim 4, wherein the solvent is iso-octane, hexane, toluene, benzene, $CO_2$, ammonia, or mixtures thereof.

7. The process of claim 2, wherein the process comprises separating one or more one-ring cycloparaffins, and one or more two-ring cycloparaffins from the hydrocarbon mixture.

8. The process of claim 7, wherein the one or more one-ring cycloparaffins comprise one or more cyclohexanes, and one or more two-ring cycloparaffins comprise one or more decalins.

9. The process of claim 1, wherein the hydrocarbon mixture comprises one or more aromatic hydrocarbons, one or more n-paraffins, one or more iso-paraffins, one or more one-ring cycloparaffins, and one or more multi-ring cycloparaffins.

10. The process of claim 9, wherein the process generates a first eluate comprising the one or more n-paraffins and the one or more iso-paraffins and a second eluate comprising one or more aromatic hydrocarbons, the one or more one-ring cycloparaffins, and the one or more multi-ring cycloparaffins.

11. The process of claim 1, wherein the process is performed between about 1 bar to about 100 bar.

12. The process of claim 1, wherein the process is performed between about 25° C. and about 250° C.

13. The process of claim 1, wherein the metal organic framework is a zirconium-based metal organic framework.

14. The process of claim 13, wherein the zirconium-based metal organic framework exhibits an X-ray diffraction pattern containing peaks at d-spacings of about 11.98 Å, 10.37 Å, 7.32 Å, 6.24 Å, 5.98 Å, and 5.18 Å.

15. The process of claim 13, wherein the zirconium-based metal organic framework comprises $Zr_6O_{32}$ clusters bridged by polytopic, carboxylate-based linkers.

16. The process of claim 13, wherein the zirconium-based metal organic framework comprises a micropore volume, as measured by $N_2$ adsorption at 77 K, greater than 0.38 cc/g.

17. The process of claim 13, wherein the zirconium-based metal organic framework comprises a residual inorganic mass after combustion of the zirconium-based metal organic framework that is greater than about 45% of dry weight of zirconium-based metal organic framework measured at 300° C.

18. The process of claim 13, wherein the zirconium-based metal organic framework can be represented by a general formula $Zr_6O_4(OH)_4BDC_{(6-x)}$, wherein BDC refers to benzene-1,4-dicarboxylate, and wherein x is greater than 0.5 as determined by residual inorganic mass after combustion.

19. The process of claim 1, wherein the adsorbent material comprises about 10% metal organic framework and about 90% binder.

20. The process of claim 1, wherein the metal organic framework is prepared using a defect modulator selected from the group consisting of acetic acid, formic acid, benzoic acid, trifluoroacetic acid, difluoroacetic acid, fluoroacetic acid, trichloroacetic acid, dichloroacetic acid, chloroacetic acid, and an alkyl derivative of acetic acid.

21. A process for separating one or more one-ring cycloparaffins and one or more multi-ring cycloparaffins from a hydrocarbon mixture, the process comprising the steps of:
providing the hydrocarbon mixture; and
contacting the hydrocarbon mixture with an adsorbent material comprising a metal organic framework to separate at least a portion of the one or more one-ring cycloparaffins and one or more multi-ring cycloparaffins from the hydrocarbon mixture by selectively retaining the at least a portion of the one or more one-ring cycloparaffins and the one or more multi-ring cycloparaffins,
wherein the process is conducted in a liquid phase, and
wherein the metal organic framework comprises a metal organic framework prepared using a defect modulator.

* * * * *